June 16, 1931.  R. A. GREENWOOD  1,810,240
SANITARY LIQUID TRAP
Filed Aug. 9, 1930
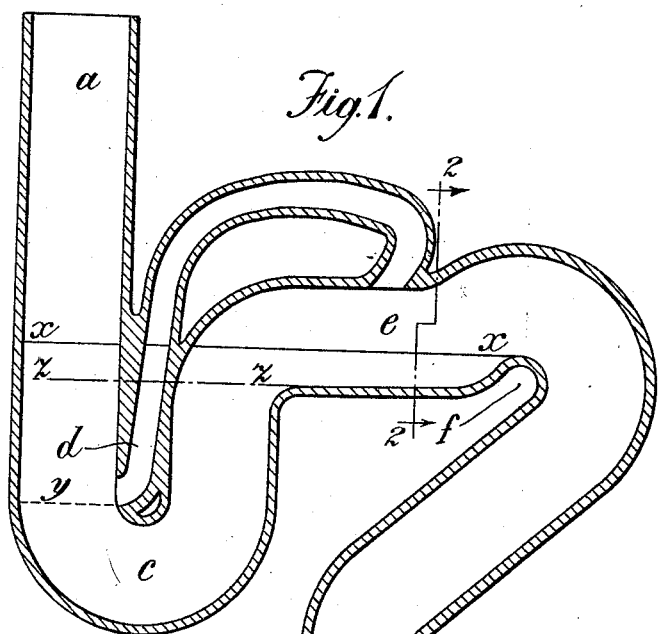
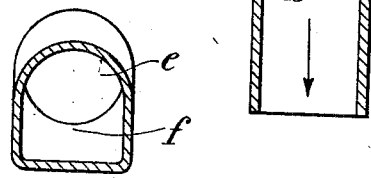
INVENTOR
R. A. GREENWOOD
BY
ATTY.

Patented June 16, 1931

1,810,240

UNITED STATES PATENT OFFICE

ROBERT ARTHUR GREENWOOD, OF CHELSEA, LONDON, ENGLAND

SANITARY LIQUID TRAP

Application filed August 9, 1930, Serial No. 474,275, and in South Africa June 4, 1930.

This invention comprises improvements in or relating to sanitary liquid traps of the type (e. g., known in the trade as S, half-S, P and bag traps) in which a liquid seal is provided in a substantially U-shaped portion of the trap and a bye-pass is arranged to communicate between a point below the normal level of the seal on the inlet branch of the aforesaid U-shaped portion and a point above the overflow level on the outlet branch.

In a trap of the above type the bye-pass aforesaid is provided for the purpose of preventing the siphoning away of the liquid seal when the pressure on the outlet side of the trap is reduced below that on the inlet side. When the pressure on the outlet side of the trap is so reduced, the sealing liquid will be drawn round the bend of the U until the level in the inlet branch falls to the point at which the bye-pass connection (normally submerged) is uncovered whereupon air will be drawn through the bye-pass and, exerting pressure on the liquid on the outlet branch of the trap, will prevent the sealing liquid from being completely discharged.

It is one object of the invention to provide means whereby an adequate supply of liquid for resealing the trap is stored in it after the discharge of some of the liquid caused by pressure differences.

The invention comprises a sanitary liquid trap of the type described in which, for the purpose specified, the outlet branch of the U-shaped portion of the trap is arranged to communicate with a laterally offset liquid storage chamber located wholly to one side of the said outlet branch, and the by-pass communicates with the said chamber at a point between the middle and the overflow end thereof, and preferably near the middle.

The liquid storage chamber aforesaid may be formed integrally with the outlet branch of the U-shaped portion of the trap, or it may be detachably secured thereto, for example, by means of screw-unions, sockets or the like.

According to a feature of the invention, the bye-pass pipe may debouch into the liquid storage chamber at such an angle that the liquid entering the chamber through said bye-pass is directed away from the overflow end of the trap.

An embodiment of the invention is illustrated in the accompanying drawings, in which:—

Figure 1 is a vertical section through the whole trap; and

Figure 2 is a section of the trap about the line 2—2 of Figure 1.

In this embodiment of the invention, the inlet is at $a$ and the outlet at $b$. The trap proper is at $c$, and $d$ represents the bye-pass from the inlet branch of the trap to the upper part of the horizontal chamber $e$.

The bye-pass is arranged to communicate with the chamber $e$ at or near the middle thereof, in order to reduce the likelihood of the water in the chamber being splashed over into the outlet pipe when suction of air takes place through the bye-pass $d$.

After the trap has been flushed, it is filled with water up to the level $x$—$x$. If suction takes place at the outlet $b$ the water overflows round the bend $f$ until the level on the inlet side falls to about the dotted line $y$, when the inlet end of the by-pass becomes uncovered and air is drawn from the inlet though the bye-pass until the pressure is equalized. The water remaining in the trap then adjusts itself to about the level $z$—$z$. If now further suction takes place before the trap has been reflushed, the water is again drawn up into the chamber $e$ until the inlet end of the bye-pass is uncovered; but no water or only a negligible quantity of water which may be splashed over, overflows round the bend $f$. The trap illustrated in the drawings may conveniently be formed by casting, stamping or drawing, and a screw-plug may be fitted to the bottom thereof to allow the trap to be cleaned. The trap may be constructed of any suitable material such as lead, iron, brass, earthenware or the like.

It will be observed that the inlet end of the bye-pass is only uncovered when suction occurs at the outlet $b$, and that consequently an adequate seal is always maintained.

A special advantage of sanitary traps according to the invention is that the quantity of water necessary in the U-shaped portion of the trap in order that the sealing level may be maintained after a portion of the water has been discharged by pressure differences is considerably less than in the case of the traps hitherto employed. It is essential that a sanitary trap should be self-cleansing and it is evident that the trap according to the invention fulfills this condition especially as regards the bye-pass connection, through which both air and water are drawn with considerable force, thereby producing a thorough scouring effect.

A further special advantage of the construction of the sanitary liquid trap illustrated in Figure 1 of the accompanying drawing is that the bye-pass debouches into the liquid storage chamber at such an angle that the tendency of the liquid drawn through the bye-pass to splash over the bend *f* to waste is greatly reduced, with the result that a smaller depth of water may be provided in the U-bend while still ensuring that an adequate sealing level is maintained after suction has taken place. This is an advantage from the hygienic point of view, owing to the improved cleansing effect when the trap is flushed.

In an alternative construction of the trap illustrated in Figure 1, the radius of the upper portion of the bend of the outlet branch where it enters the chamber *e* may be reduced. It is found that in this case the tendency of the liquid to siphon over to waste when suction occurs is still further reduced.

The section of the trap according to the invention is preferably substantially circular, as illustrated in Figure 2, but it is within the invention to employ a substantially square, oval, triangular or other suitable section.

The trap may be formed in one piece from a metal, such for example as lead, by drawing, casting, stamping, or by a similar process, but it may, if desired, be built up of several elements detachably secured together, for example, by means of screw-unions, sockets or the like. Thus, the bye-pass may be detachable at one or both ends from the body of the trap, and the U-shaped portion of the trap may be formed of two sections united together by a suitable union. Screw-unions may conveniently be provided on the inlet and outlet branches of the trap, to enable the latter to be attached to the fitting with which it is to be used, and to the waste pipe.

The trap may also be made of earthenware or other suitable material.

What I claim is:—

A sanitary liquid trap including a laterally offset liquid storage chamber communicating with and located wholly to one side of the outlet branch of the trap proper, and a by-pass communicating with the chamber adjacent the overflow end of such chamber, the exit end of the by-pass inclining at an angle to the flow of the liquid, whereby the liquid flows from the by-pass into the chamber in a direction away from the overflow end of the chamber.

ROBERT ARTHUR GREENWOOD.